(12) United States Patent
Franca-Neto

(10) Patent No.: US 10,216,571 B2
(45) Date of Patent: Feb. 26, 2019

(54) SYSTEM AND METHODOLOGY FOR ERROR MANAGEMENT WITHIN A SHARED NON-VOLATILE MEMORY ARCHITECTURE USING BLOOM FILTERS

(71) Applicant: Western Digital Technologies, Inc., Irvine, CA (US)

(72) Inventor: Luiz M. Franca-Neto, Sunnyvale, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 146 days.

(21) Appl. No.: 15/469,384

(22) Filed: Mar. 24, 2017

(65) Prior Publication Data

US 2018/0129557 A1 May 10, 2018

Related U.S. Application Data

(63) Continuation-in-part of application No. 15/428,745, filed on Feb. 9, 2017, which is a continuation-in-part of application No. 15/396,238, filed on Dec. 30, 2016.

(60) Provisional application No. 62/420,501, filed on Nov. 10, 2016.

(51) Int. Cl.
*G06F 11/00* (2006.01)
*G06F 11/10* (2006.01)

(52) U.S. Cl.
CPC ................................ *G06F 11/1048* (2013.01)

(58) Field of Classification Search
CPC .................................................. G06F 11/1148
See application file for complete search history.

(56) References Cited

U.S. PATENT DOCUMENTS

| | | | |
|---|---|---|---|
| 6,567,935 B1 * | 5/2003 | Figueroa | G06F 11/0775 714/37 |
| 6,618,281 B1 | 9/2003 | Gordon | |
| 6,978,343 B1 | 12/2005 | Ichiriu | |
| 7,237,156 B1 | 6/2007 | Srinivasan et al. | |
| 7,373,558 B2 * | 5/2008 | Mukherjee | G06F 11/0715 714/10 |

(Continued)

OTHER PUBLICATIONS

Pellizzer et al, "Reliability characterization of Phase Change Memory", https://www.researchgate.net/publication/237352531_Reliability_characterization_of_Phase_Change_Memory; 6 pages.

(Continued)

*Primary Examiner* — Esaw T Abraham
(74) *Attorney, Agent, or Firm* — Loza & Loza, LLP; Gabriel Fitch

(57) ABSTRACT

Various aspects directed towards facilitating error management within a shared non-volatile memory (NVM) architecture are disclosed. Data is stored in an NVM, and error correction vector (ECV) information associated with the NVM is stored in an error tracking table (ETT) within one of a dynamic random access memory (DRAM) or a second NVM component. The ETT is then filtered with a Bloom filter to predict a subset of ETT entries that include a reporting of an error in the NVM. A parallel query of the NVM and the ETT is then performed, which includes a query of the NVM that yields a readout of the NVM, and a query of the ETT that is limited to a query of the subset of ETT entries predicted by the Bloom filter which yields a construction of an ECV corresponding to the readout of the NVM.

25 Claims, 13 Drawing Sheets

(56) References Cited

U.S. PATENT DOCUMENTS

| | | | |
|---|---|---|---|
| 8,634,248 | B1 | 1/2014 | Sprouse et al. |
| 8,839,053 | B2 | 9/2014 | Schechter et al. |
| 9,083,981 | B2 * | 7/2015 | Sugio .................... H04N 19/52 |
| 9,130,597 | B2 | 9/2015 | Cooke |
| 9,225,356 | B2 | 12/2015 | Mu et al. |
| 9,257,184 | B2 | 2/2016 | Rao |
| 9,280,421 | B2 | 3/2016 | Nazarian et al. |
| 9,323,602 | B2 | 4/2016 | Hoekstra et al. |
| 9,626,243 | B2 * | 4/2017 | Nicholson ........... G06F 11/1012 |
| 9,761,292 | B2 * | 9/2017 | Seol ....................... G06F 21/31 |
| 9,782,069 | B2 * | 10/2017 | Bellamy ................ A61B 3/113 |
| 2004/0019835 | A1 * | 1/2004 | Marisetty ........... G06F 11/0724 714/48 |
| 2004/0205385 | A1 * | 10/2004 | Smith .................... G06F 11/10 714/6.12 |
| 2006/0075301 | A1 * | 4/2006 | Fossum ................ G06F 9/3824 714/38.13 |
| 2015/0121166 | A1 | 4/2015 | Goodman et al. |

OTHER PUBLICATIONS

Hoffman et al, "Wear-out analysis of error correction techniques in phase-change memory", http://dl.acm.org/citation.cfm?id=2616606. 2616647; 2 pages.

Pagiamtzis et al, "A Soft-Error Tolerant Content-Addressable Memory (CAM) Using an Error-Correcting-Match Scheme", http://ieeexplore. ieee.org/stamp/stamp.jsp?tp=&arnumber=4114964&isnumber= 4114894; 3 pages.

Kong et al, "Low-Complexity Low-Latency Architecture for Matching of Data Encoded With Hard Systematic Error-Correcting Codes" abstract, IEEE Transactions on Very Large Scale Integration (VLSI) Systems, vol. 22, Issue: 7, Jul. 2014; published Aug 20, 2013; pp. 1648-1652; http://ieeexplore.ieee.org/document/6583335/.

Luiz Franca-Neto U.S. Appl. No. 15/011,538, filed Jan. 30 2016, 31 pages.

Luiz Franca-Neto U.S. Appl. No. 15/011,539, filed Jan. 30 2016, 43 pages.

* cited by examiner

SYSTEM AND METHODOLOGY FOR ERROR MANAGEMENT WITHIN A SHARED NON-VOLATILE MEMORY ARCHITECTURE USING BLOOM FILTERS

CROSS-REFERENCE TO RELATED APPLICATIONS

This application is a continuation-in-part of U.S. patent application Ser. No. 15/428,745, filed Feb. 9, 2017, entitled "SYSTEM AND METHODOLOGY FOR LOW LATENCY ERROR MANAGEMENT WITHIN A SHARED NON-VOLATILE MEMORY ARCHITECTURE," which is a continuation-in-part of U.S. patent application Ser. No. 15/396,238, filed Dec. 30, 2016, entitled "SYSTEM AND METHODOLOGY THAT FACILITATES ERROR MANAGEMENT WITHIN A SHARED NON-VOLATILE MEMORY ARCHITECTURE," which claims the benefit of U.S. Provisional Patent Application Ser. No. 62/420,501, filed Nov. 10, 2016, entitled "SYSTEM AND METHODOLOGY THAT FACILITATES ERROR MANAGEMENT WITHIN A SHARED NON-VOLATILE MEMORY ARCHITECTURE," wherein the entire contents of each application are incorporated herein by reference.

TECHNICAL FIELD

The subject disclosure generally relates to non-volatile memory (NVM), and more specifically to a system and methodology for error management within a shared NVM architecture.

BACKGROUND

Conventional datacenter computing systems use various components that are generally known in the art. For instance, such systems typically include an assembly of servers with processors, memory, etc. in which standard buses and input/output (I/O) controllers are typically deployed. Recent trends favor larger memory provisioning for database, in-memory-processing, and low latency system responses. It is desired that non-volatile memory (NVM) technology may someday support low latency applications (200 nanoseconds (ns) to 400 ns readouts), which may be used in Storage Class Memory (SCM) solutions, and/or, in multiprocessor systems, where NVM may be used as shared-memory. Relative to Dynamic Random Access Memory (DRAM), however, conventional NVM systems, such as Phase Change Memory (PCM), Resistive Random Access Memory (ReRAM), and Magnetoresistive Random Access Memory (MRAM), have several limitations. For instance, conventional NVM systems (a) are orders of magnitude more energy demanding than DRAM to write a bit; (b) have finite endurance as opposed to the virtually infinite endurance of DRAM; and (c) have an undesirably high error rate immediately after fabrication (e.g., raw Bit Error Rate (RBER) of NVM systems are approximately 1E-5 or 1E-6, whereas "error-free" operation would involve an Uncorrectable Bit Error Rate (LIBER)<1E-18).

Accordingly, it would be desirable to provide a system and method which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with error management within a shared non-volatile memory (NVM) architecture. In one such aspect, a method is provided which includes storing data in an NVM array, and storing error correction vector (ECV) information associated with the NVM array in an error tracking table (ETT). The method further includes filtering the ETT with at least one Bloom filter to predict at least one subset of ETT entries in which at least one of the ETT entries corresponds to a reporting of an error in the NVM array. A parallel query of the NVM array and the ETT is then performed, which includes a query of the NVM array that yields a readout of the NVM array, and a query of the ETT that yields a construction of an ECV corresponding to the readout of the NVM array. For this embodiment, the query of the ETT is limited to a query of the at least one subset of ETT entries predicted by the at least one Bloom filter.

In another aspect, a system is provided, which includes an NVM component, an ETT component, and a controller. Within such embodiment, the NVM component is configured to store data in an NVM array, whereas the ETT component is configured to store ECV information associated with the NVM array. For this embodiment, the ETT component is within one of a dynamic random access memory (DRAM) or a second NVM component. The controller is then configured to perform a parallel query of the NVM array and the ETT component, which includes a query of the NVM array that yields a readout of the NVM array, and a query of the ETT component that yields a construction of an ECV corresponding to the readout of the NVM array.

In a further aspect, an apparatus is provided. For this particular embodiment, the apparatus includes means for storing data in an NVM array, and means for storing ECV information associated with the NVM array in an ETT. The apparatus further includes means for filtering the ETT with at least one Bloom filter to predict at least one subset of ETT entries in which at least one of the ETT entries corresponds to a reporting of an error in the NVM array. The apparatus also includes means for performing a parallel query of the NVM array and the ETT, which includes a query of the NVM array that yields a readout of the NVM array, and a query of the ETT that yields a construction of an ECV corresponding to the readout of the NVM array. For this embodiment, the query of the ETT is limited to a query of the at least one subset of ETT entries predicted by the at least one Bloom filter.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
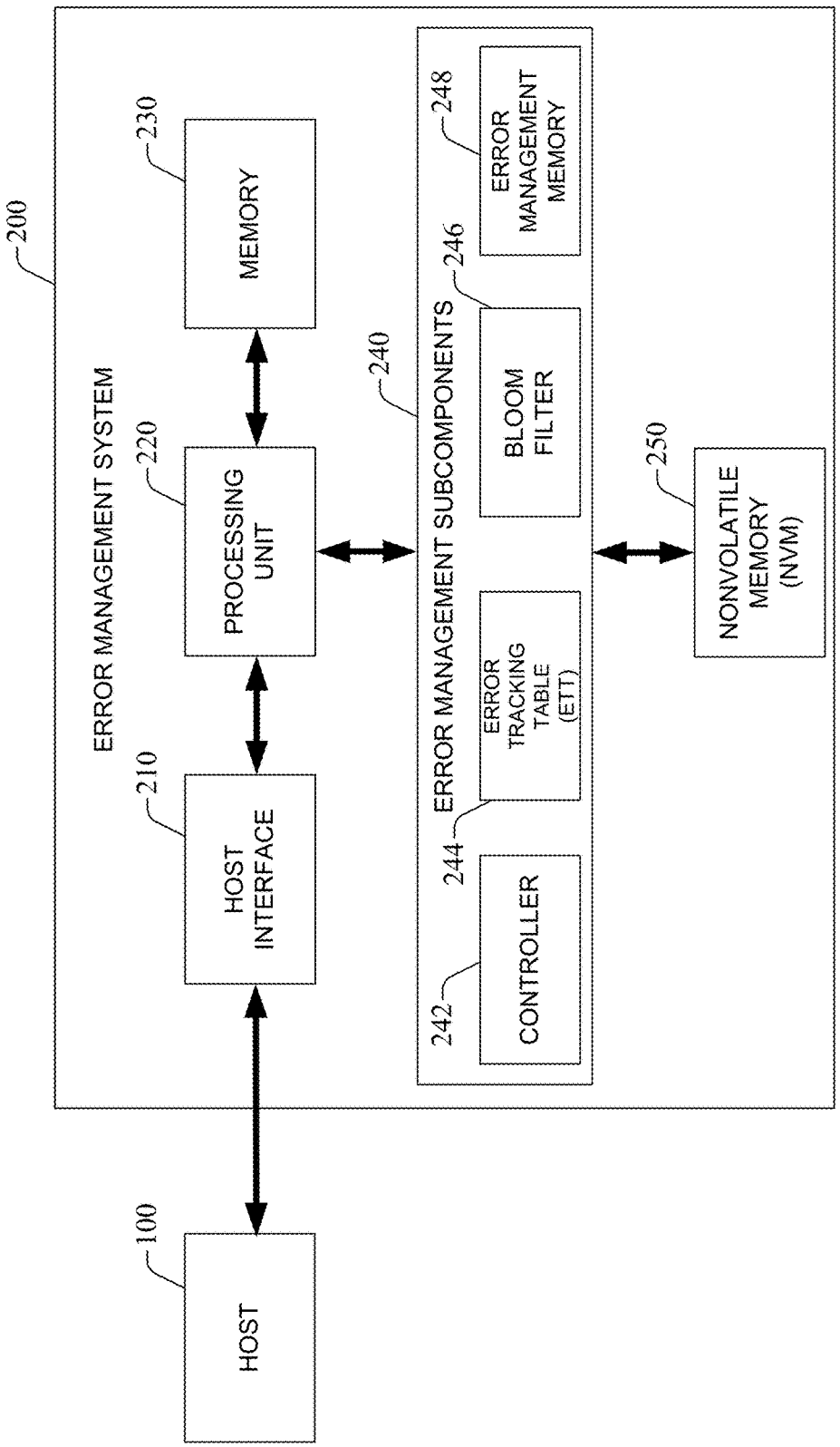
FIG. 1 is a block diagram of an exemplary error management system in accordance with aspects disclosed herein.

As discussed in the background, it is desirable to provide a system and method which overcomes the various limitations of conventional non-volatile memory (NVM) systems and NVM technology. The embodiments disclosed herein are directed towards overcoming such limitations by providing various error management schemes that may be implemented within a shared NVM architecture. For instance, in a particular embodiment, an error correction scheme is disclosed in which error correction is performed in parallel with a readout of NVM cells (i.e., data obtained from NVM cells via a read operation). Within such embodiment Bloom filters are used to optimize searches for potential errors.

To better illustrate the desirability of such embodiments, a brief summary of limitations associated with conventional NVM systems is provided. First, it is contemplated that the error position and correct content of an NVM cell may be reported in an error tracking table (ETT), wherein such scheme has been shown to provide protection against end-of-life massive Bit Error Rate (BER) in emerging NVM with very low overhead in 64 bytes (or 32 bytes or 8 bytes—width of a 64-bit memory bus) memory datasets. For instance, for an NVM presenting RBER=1E-3 and UBER<1E-18, in 64 bytes (64 B), the ETT-based approach disclosed herein supports designs at or better than 3% overhead for error correction, as opposed to more than 21% overhead in Forward Error Correction (FEC) approaches. Furthermore, although embodiments of the ETT designs disclosed herein are very fast analog-digital designs that may respond in tens of nanoseconds (ns), it is contemplated that these ETT designs will be queried in parallel with the NVM array such that the ETT might only need to respond in 200 ns or even 300 ns to have its latency effectively hidden behind the NVM readout latency (200 ns-400 ns) occurring in parallel. There is therefore a need for a cheaper design of the disclosed ETT concept which provides the same aforementioned benefits, but also takes advantage of a more relaxed latency requirement for the ETT.

In an exemplary embodiment, a solution in which the ETT is configured within a dynamic random access memory (DRAM) is proposed. Here, it should be appreciated that NVMs at the end of their life (BER~1E-3) might present "healthy cells" with non-volatility of approximately half a week or less. In an aspect of the disclosure, since long term non-volatility is not truly expected, the aforementioned ETT content is moved into a table in volatile memory (e.g., an ETT-in-DRAM or ETT-in-NVM design) that is faster and less susceptible to errors. Since the NVM and the ETT-in-DRAM are queried in parallel, the latency of the ETT-in-DRAM is hidden behind the latency of the NVM readout itself so long as the ETT-in-DRAM latency is smaller than the NVM readout latency. The total readout latency will also be smaller than total readout latency with any FEC approach. Bloom filters may also be added which allow the system to zoom into the actual lines of the ETT-in-DRAM/ETT-in-NVM where error(s) might be reported, which improves overall performance.

Exemplary Embodiments

Referring next to FIG. 1, a block diagram is provided of an exemplary system for an error management scheme in accordance with an embodiment of the disclosure. Within such embodiment, an error management system 200 is coupled to a host 100, as shown. The host 100 provides commands to the error management system 200 for transferring data between the host 100 and the error management system 200. For example, the host 100 may provide a write command to the error management system 200 for writing data to the error management system 200, or a read command to the error management system 200 for reading data from the error management system 200. To this end, it is contemplated that the host 100 may be any system or device having a need for data storage or retrieval and a compatible interface for communicating with the error management system 200. For example, the host 100 may a computing device, a personal computer, a portable computer, or workstation, a server, a personal digital assistant, a digital camera, a digital phone, or the like.

The error management system 200 includes a host interface 210, a processing unit 220, a memory 230, and an NVM 250. The host interface 210 is coupled to the processing unit 220 and facilitates communication between the host 100 and the processing unit 220. Additionally, the processing unit 220 is coupled to the memory 230 and the NVM 250. The host interface 210 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host 100 includes the error management system 200. In other embodiments, the error management system 200 is remote with respect to the host 100 or is contained in a remote computing system coupled in communication with the host 100. For example, the host 100 may communicate with the error management system 200 through a wireless communication link.

The processing unit 220 controls operation of the error management system 200. In various embodiments, the processing unit 220 receives commands from the host 100 through the host interface 210 and performs the commands to transfer data between the host 100 and the NVM 250. The processing unit 220 may include any type of processing device, such as a microprocessor, a microcontroller, an embedded controller, a logic circuit, software, firmware, or the like, for controlling operation of the error management system 200.

In some embodiments, some or all of the functions described herein as being performed by the processing unit 220 may instead be performed by another element of the error management system 200. For example, the error management system 200 may include a microprocessor, a microcontroller, an embedded controller, a logic circuit, software, firmware, or any kind of processing device, for performing one or more of the functions described herein as being performed by the processing unit 220. In some embodiments, one or more of the functions described herein as being performed by the processing unit 220 are instead performed by the host 100. In some embodiments, some or all of the functions described herein as being performed by the processing unit 220 may instead be performed by another element such as a controller in a hybrid drive including both non-volatile memory elements and magnetic storage elements.

The memory 230 may be any memory, computing device, or system capable of storing data. For example, the memory 230 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the processing unit 220 uses the memory 230, or a portion thereof, to store data during the transfer of data between the host 100 and the NVM 250. For example, the memory 230 or a portion of the memory 230 may be a cache memory.

The NVM 250 receives data from the processing unit 220 and stores the data. The NVM 250 may be any type of non-volatile memory, such as a flash storage system, a solid state drive, a flash memory card, a secure digital (SD) card, a universal serial bus (USB) memory device, a CompactFlash card, a SmartMedia device, a flash storage array, or the like.

In an aspect of the disclosure, it is contemplated that the processing unit 220 can be configured to implement the error management schemes disclosed herein on the NVM 250 by controlling various aspects of the error management subcomponents 240. As illustrated, the error management subcomponents 240 may include a controller 242, an ETT 244, a Bloom filter 246, and an error management memory 248. Within such embodiment, the NVM 250 is configured to store data in an NVM array, whereas the ETT 244 is configured to store ECV information associated with the NVM array, wherein the controller 242 is then configured to construct an ECV corresponding to a readout of the NVM array by querying the ETT 244. Here, it is contemplated that an ECV for a particular bit is an ETT 244 entry, which includes any of various types of information that may be used to correct a potential error in that bit. To this end, it should be appreciated that information from the ETT 244 may be used to to 1) allow some bits from the data read from the NVM array to pass through (those are correct bits), and 2) block bits at positions the ETT 244 deems are bits in error. But, since each line in the ETT 244 may also be configured to include the correct bit information (See e.g., FIG. 9), this correct bit may be inserted in place of the corresponding bit which was blocked. Since more than one error might have been reported in the ETT 244 for a given address in the NVM array, more than one line might be read from the ETT 244, and more than one bit from the NVM array might be blocked and their corresponding correct bit inserted using information from the ETT 244.

For some embodiments, as will be discussed later, the ETT 244 is configured within the error management memory 248, wherein the error management memory 248 is either a DRAM or a second NVM component. Embodiments are also disclosed in which the Bloom filter 246 is configured to filter the ETT 244 to predict a subset of ETT entries that include a reporting of an error in the NVM 250. Meanwhile, the controller 242 is configured to perform a parallel query of the NVM 250 and the ETT 244, which includes a query of the NVM 250 that yields a readout of the NVM 250, and a query of the ETT 244 which yields a construction of an ECV corresponding to the readout of the NVM 250. For this embodiment, however, the query of the ETT 244 is limited to a query of the subset of ETT entries predicted by the Bloom filter 246. Also, with respect to controller 242, it should be appreciated that controller 242 can be a special purpose controller specifically configured/programmed to perform any of the functions disclosed herein.

Referring next to FIGS. 2-5, four exemplary embodiments 305, 405, 505, and 605, for error management systems 300, 400, 500, and 600 are respectively provided in accordance with aspects disclosed herein. Here, it should be appreciated that each design performs NVM readouts in parallel with queries to Bloom filters and ETT-in-DRAM/ETT-in-NVM variations. For each design, it is also assumed that the controllers 342, 442, 542, and 642 are respectively subcomponents of the processing units 320, 420, 520, and 620, and that the error management memories 348, 448, 548, and 648 are respectively subcomponents of the memories 330, 430, 530, and 630, as shown. Furthermore, whereas end of life NVM BER=1E-3, it is contemplated that the ETT designs disclosed herein may provide UBER<1E-18, where ETT overhead is designed to use only 3% (in number of cells), and the Bloom filters 346, 446, 546, and 646 are respectively designed to use ⅙ of the number of cells used by the ETT 344, 444, 544, and 644.

Figure 2:
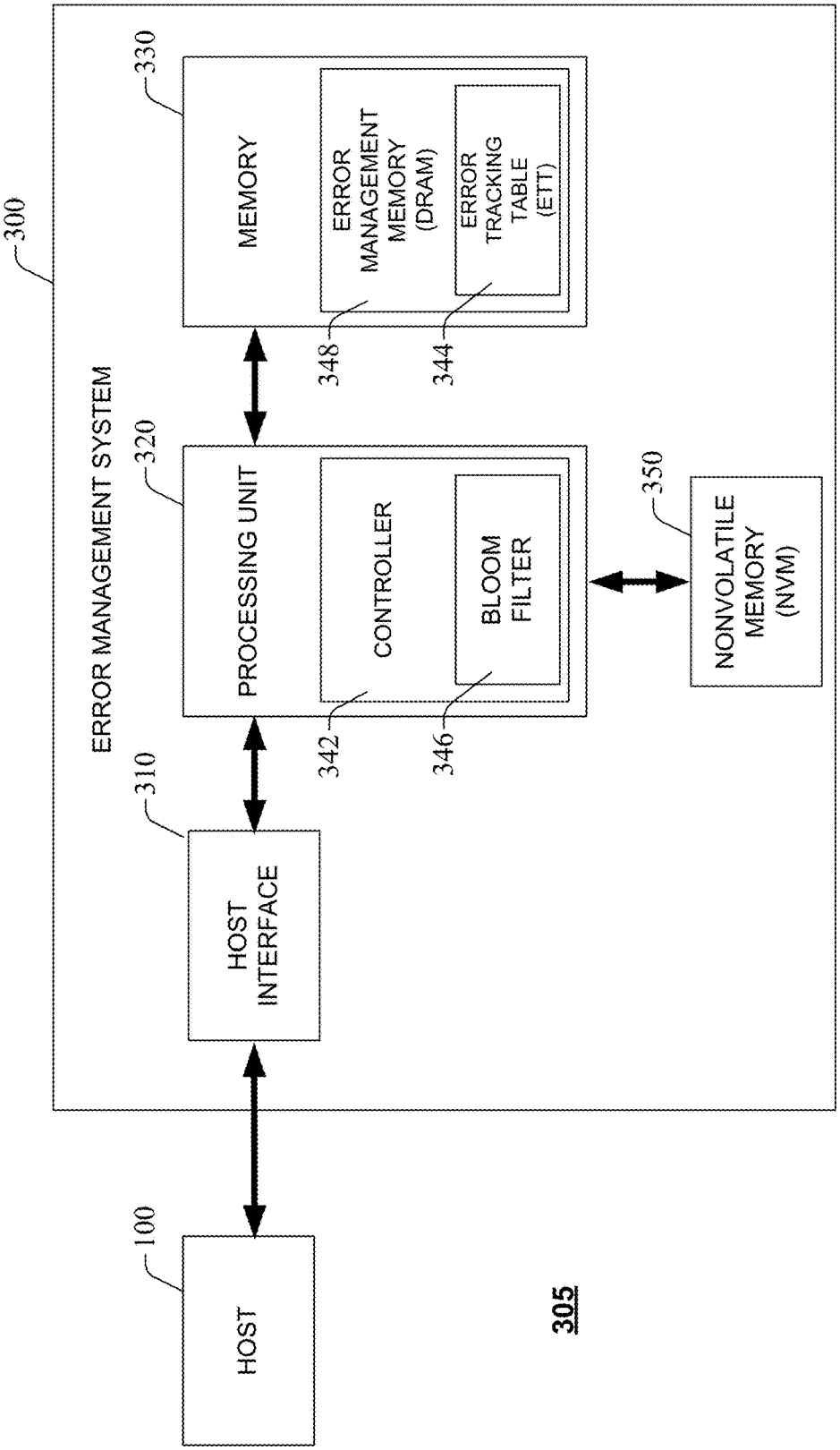
FIG. 2 illustrates a first exemplary error management system with an ETT-in-DRAM design in accordance with aspects disclosed herein.

In FIG. 2, a first exemplary embodiment 305 for error management system 300 is provided. For this particular embodiment 305, the Bloom filter 346 is configured within the controller 342, as shown. As previously stated, however, because NVMs at the end of their life might present "healthy cells" with non-volatility of approximately half of a week or less, long term non-volatility is not truly expected. The content of ETT 344 may thus be moved into a table in volatile memory that is faster and less susceptible to errors, such as a DRAM. Accordingly, for this particular embodiment 305, it is contemplated that the ETT 344 is configured within the error management memory 348, wherein the error management memory 348 is a DRAM, as shown.

Figure 3:
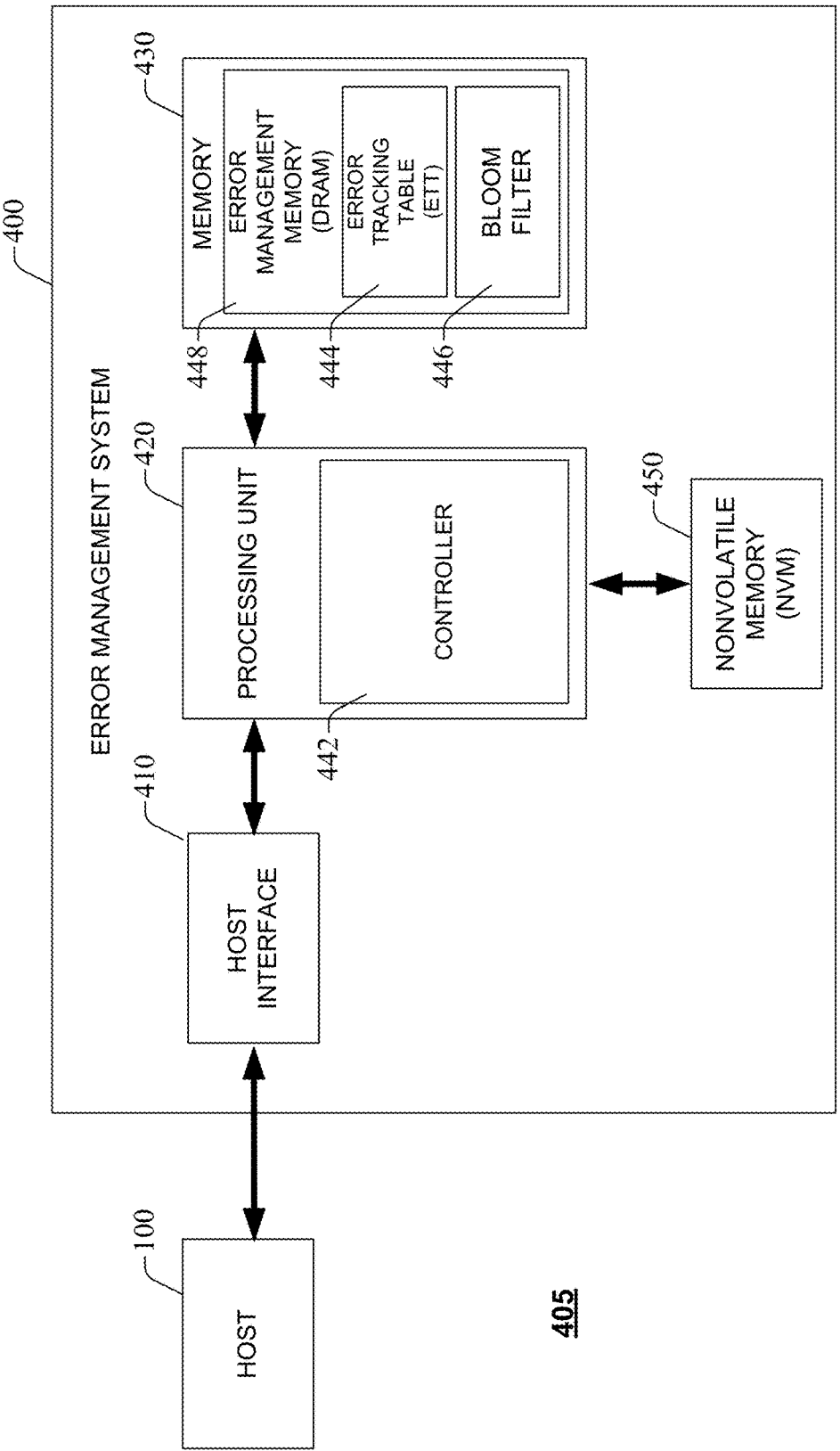
FIG. 3 illustrates a second exemplary error management system with an ETT-in-DRAM design in accordance with aspects disclosed herein.

In FIG. 3, another exemplary ETT-in-DRAM embodiment 405 is provided. Here, similar to the embodiment 305 illustrated in FIG. 2, the ETT 444 is again configured within the error management memory 448, wherein the error management memory 448 is a DRAM. For this embodiment 405, however, the Bloom filter 446 is also configured within the error management memory 448, as shown.

Figure 4:
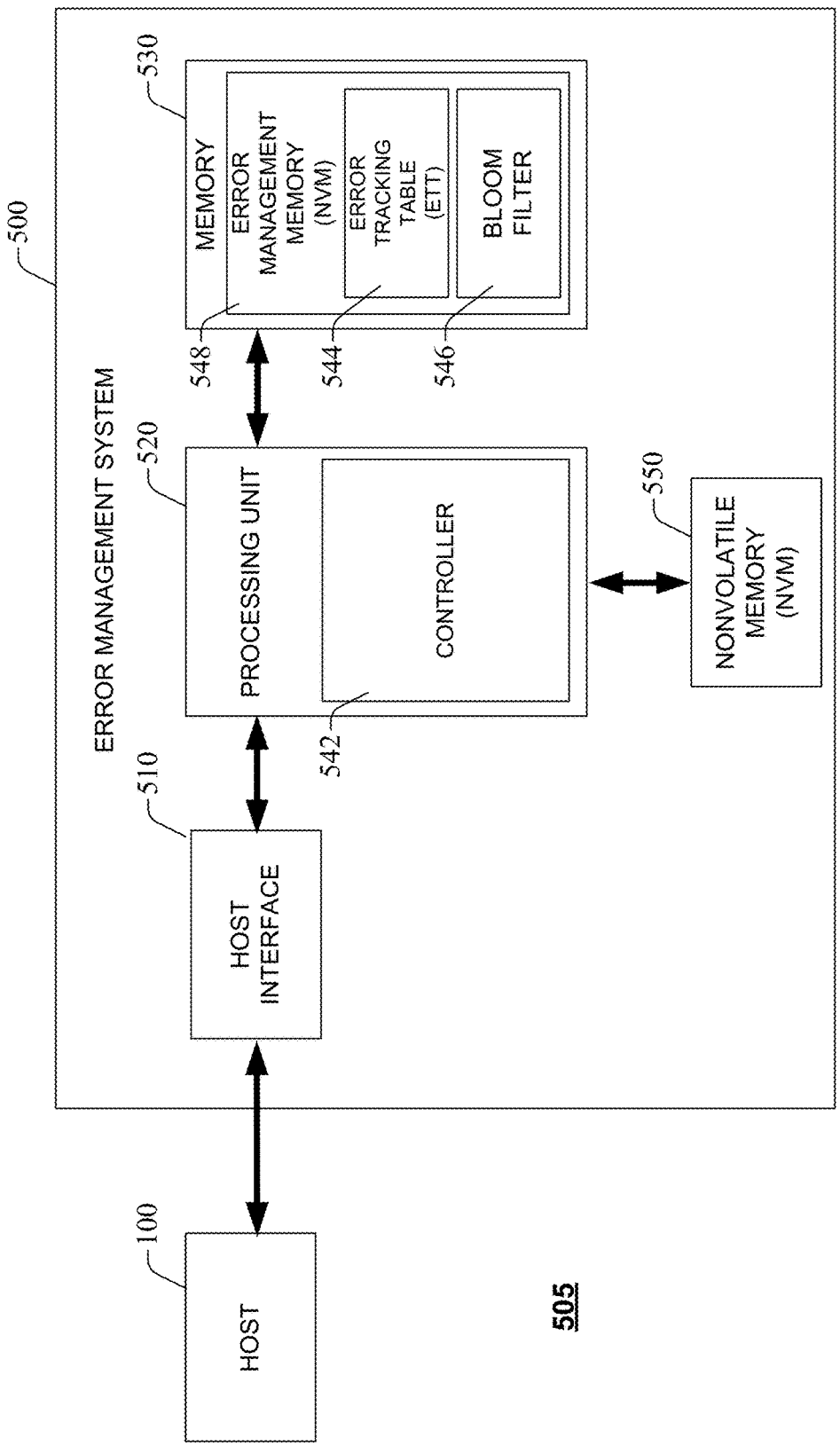
FIG. 4 illustrates a first exemplary error management system with an ETT-in-NVM design in accordance with aspects disclosed herein.

In addition to ETT-in-DRAM designs, ETT-in-NVM designs are also contemplated. For instance, as illustrated in FIG. 4, a low cost ETT-in-NVM embodiment 505 is contemplated, wherein the error management memory 548 is an NVM, as shown. Moreover, for this particular embodiment 505, the ETT 544 and Bloom filter 546 are both configured within the NVM-based error management memory 548, as shown.

Figure 5:
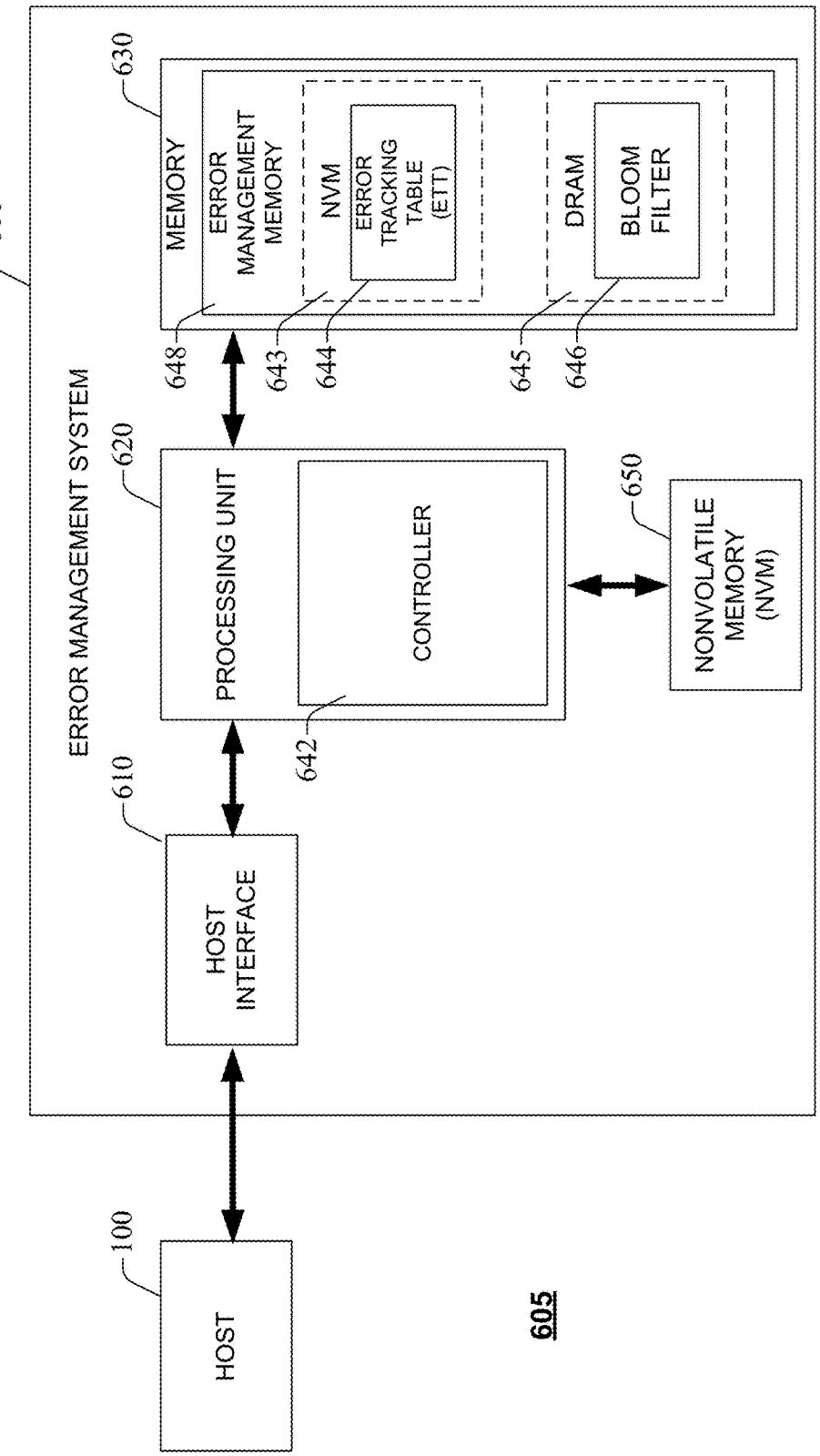
FIG. 5 illustrates a second exemplary error management system with an ETT-in-NVM design in accordance with aspects disclosed herein.

Referring next to FIG. 5, another exemplary ETT-in-NVM embodiment 605 is provided. Here, in order to compromise between performance and use of a DRAM, the error management memory 648 includes both a DRAM component 645 and a second NVM component 643, as shown. Within such embodiment 605, the Bloom filter 646 is configured within the DRAM component 645, whereas the ETT 644 is configured within the second NVM component 643.

Figure 6:
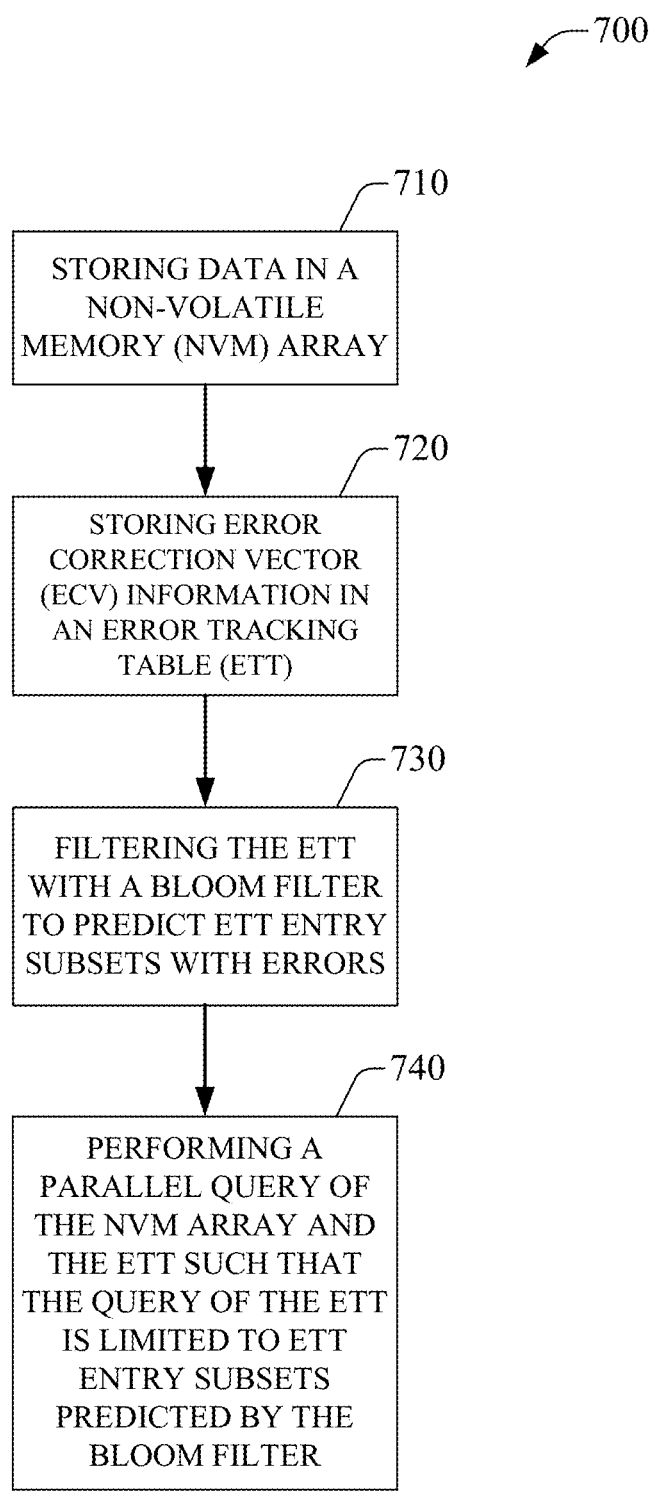
FIG. 6 is a flow diagram of an exemplary methodology for an error management scheme in accordance with an aspect of the subject specification

Referring next to FIG. 6, a flow chart illustrating an exemplary method for an error management scheme according to an embodiment is provided. As illustrated, process 700 includes a series of acts that may be performed by an NVM system (e.g., error management system 200, 300, 400, 500, or 600) according to an aspect of the subject specification. For instance, process 700 may be implemented by employing a processor to execute computer executable instructions stored on a computer readable storage medium to implement the series of acts. In another embodiment, a computer-readable storage medium comprising code for causing at least one computer to implement the acts of process 700 is contemplated.

As illustrated, process 700 begins at act 710 with the storage of data in an NVM array. In certain aspects, with reference to error management systems 200, 300, 400, 500, and 600, act 710 may be effectuated with their respective processing units 220, 320, 420, 520, and 620, individually, or in combination with the host 100, wherein the data is stored in the NVM 250, 350, 450, 550, or 650, for instance. In another aspect, it should be appreciated that act 710 may represent one means for storing data in an NVM array.

At act 720, process 700 then proceeds by storing ECV information associated with the NVM array in an ETT. Referring again to error management systems 200, 300, 400, 500, and 600, act 720 may also be effectuated with their respective processing units 220, 320, 420, 520, and 620, individually, or in combination with the host 100, wherein the ECV information is stored in the ETT 244, 344, 444, 544, or 644, for instance. As previously stated, both ETT-in-DRAM and ETT-in-NVM configurations are contemplated. Accordingly, act 720 may comprise storing ECV information in an ETT configured within a DRAM (See e.g., embodiments 305 and 405 illustrated in FIGS. 2 and 3, respectively), or storing ECV information in an ETT configured within an NVM (See e.g., embodiments 505 and 605 illustrated in FIGS. 4 and 5, respectively). Furthermore, it should be appreciated that act 720 may represent one means for storing ECV information in an ETT.

Figure 7:
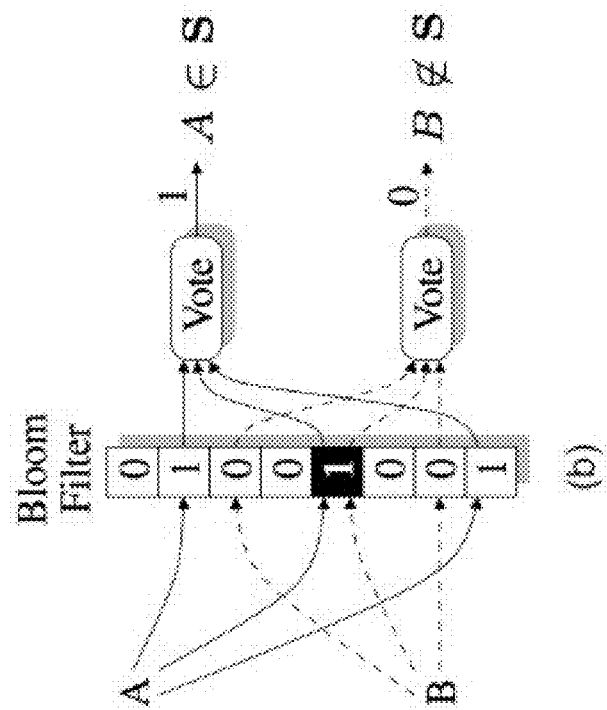
FIG. 7 illustrates an exemplary hash table and Bloom filter.
Figure 7:
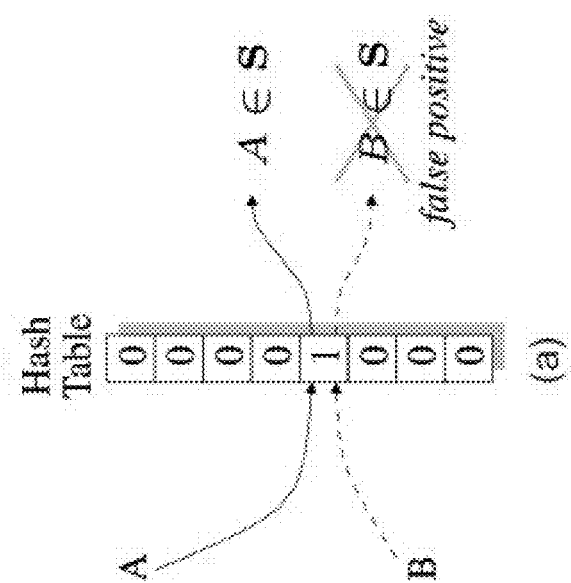
Figure 8:
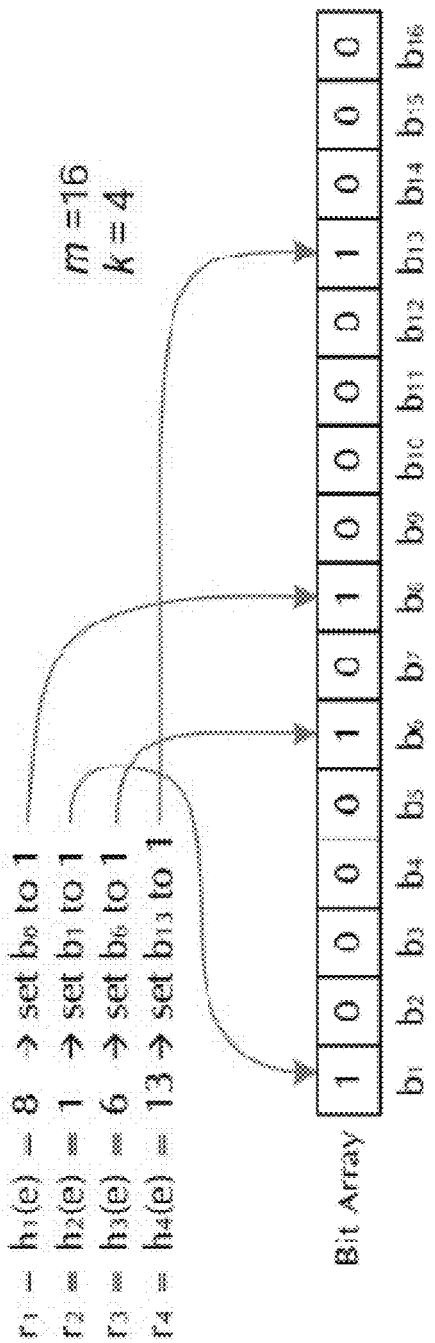
FIG. 8 illustrates an exemplary bloom filter having k random hash functions and m bit positions.

As illustrated, at act 730, process 700 also includes filtering the ETT with a Bloom filter to predict ETT entry subsets in which NVM errors may reside (See e.g., FIGS. 7-8 and corresponding text infra). In certain aspects, with reference to error management systems 200, 300, 400, 500, and 600, act 730 may be effectuated with their respective processing units 220, 320, 420, 520, and 620 in combination with their respective Bloom filters 246, 346, 446, 546, and 646, and ETTs 244, 344, 444, 544, and 644, for instance. As previously stated, various Bloom filter configurations are contemplated including, for example, where the Bloom filter is configured within a controller (See e.g., embodiment 305 illustrated in FIG. 2), within a DRAM (See e.g., embodiments 405 and 605 illustrated in FIGS. 3 and 5, respectively), or within an NVM (See e.g., embodiment 505 illustrated in FIG. 4). Accordingly, act 730 may comprise filtering the ETT with a Bloom filter configured within a controller, filtering the ETT with a Bloom filter configured within a DRAM, or filtering the ETT with a Bloom filter configured within an NVM. Furthermore, it should be appreciated that act 730 may represent one means for filtering the ETT with a Bloom filter.

At act 740, process 700 then concludes by performing a parallel query of the NVM array and the ETT, wherein the query of the ETT is limited to a query of the ETT entry subsets predicted by the Bloom filter. With reference to error management systems 200, 300, 400, 500, and 600, act 740 may be effectuated with their respective controllers 242, 342, 442, 542, and 642 in combination with their respective Bloom filters 246, 346, 446, 546, and 646; ETTs 244, 344, 444, 544, and 644; and NVMs 250, 350, 450, 550, and 650. Furthermore, it should be appreciated that act 740 may represent one means for performing a parallel query of the NVM array and the ETT.

With respect to Bloom filters, it is contemplated that any of various Bloom filter configurations may be utilized. By way of background, it should be noted that Bloom filters are typically employed for membership queries. They may occasionally return false positives (i.e., predicting a member is in the set, when it is not) but they never return false negatives (i.e., once it predicts a member is not in the set, it is guaranteed not to be a member of the set). The false positives, once tolerated, allow for a much more compact realization of Bloom filters compared to a data-structure that guarantees no errors. The probability of false positives can be adjusted by design choice.

Referring next to FIG. 7, an exemplary hash table and Bloom filter is provided. Namely, FIG. 7(a) shows a single-index hash table, which is at greater risk of returning many false positives than the Bloom filter illustrated in FIG. 7(b) which utilizes three hash functions. In FIG. 7(a), A belongs to set S, wherein a hash of A provides an index to a particular bit in the table, which is set to "1" to indicate membership in S. For this particular example though, B, which does not belong to S, hashes to the same entry, so its hash produces a false positive.

As indicated in FIG. 7(b), a Bloom filter uses multiple hash functions for each element, wherein several bits in the table are set for each element that belong to a set S. A unanimous vote is required to determine that element A belongs to S, for example. If only one vote is "0", an element is declared not to belong to S. By adjusting the number of elements in a set, the number of hash functions, and/or the number of bits used in a table, the probability of a false positive may be adjusted to smaller number, as desired.

Referring next to FIG. 8, an exemplary bloom filter having k random hash functions and m bit positions is provided. For this particular example, m=16 and k=4, as illustrated. In general, however, it should be noted that a set S={x1, x2, x3, . . . , xn} of n elements is described by an array of m bits, wherein each bit is initially set to "0". Furthermore, k independent hash functions, h1, h2, h3, . . . , hk, with range {1, 2, 3 . . . , m} are randomly and uniformly distributed in this range. For each x in S, the bits $h_i(x)$ are set to "1" for all $1 \leq i \leq k$. To check if an element y is in S, a check is made as to whether all $h_i(y)$ are set to "1". If not, y is not a member of S. Otherwise, if all $h_i(y)$ are set to "1", it is assumed that y is in S, with some small probability of the result being a false positive.

Figure 9:
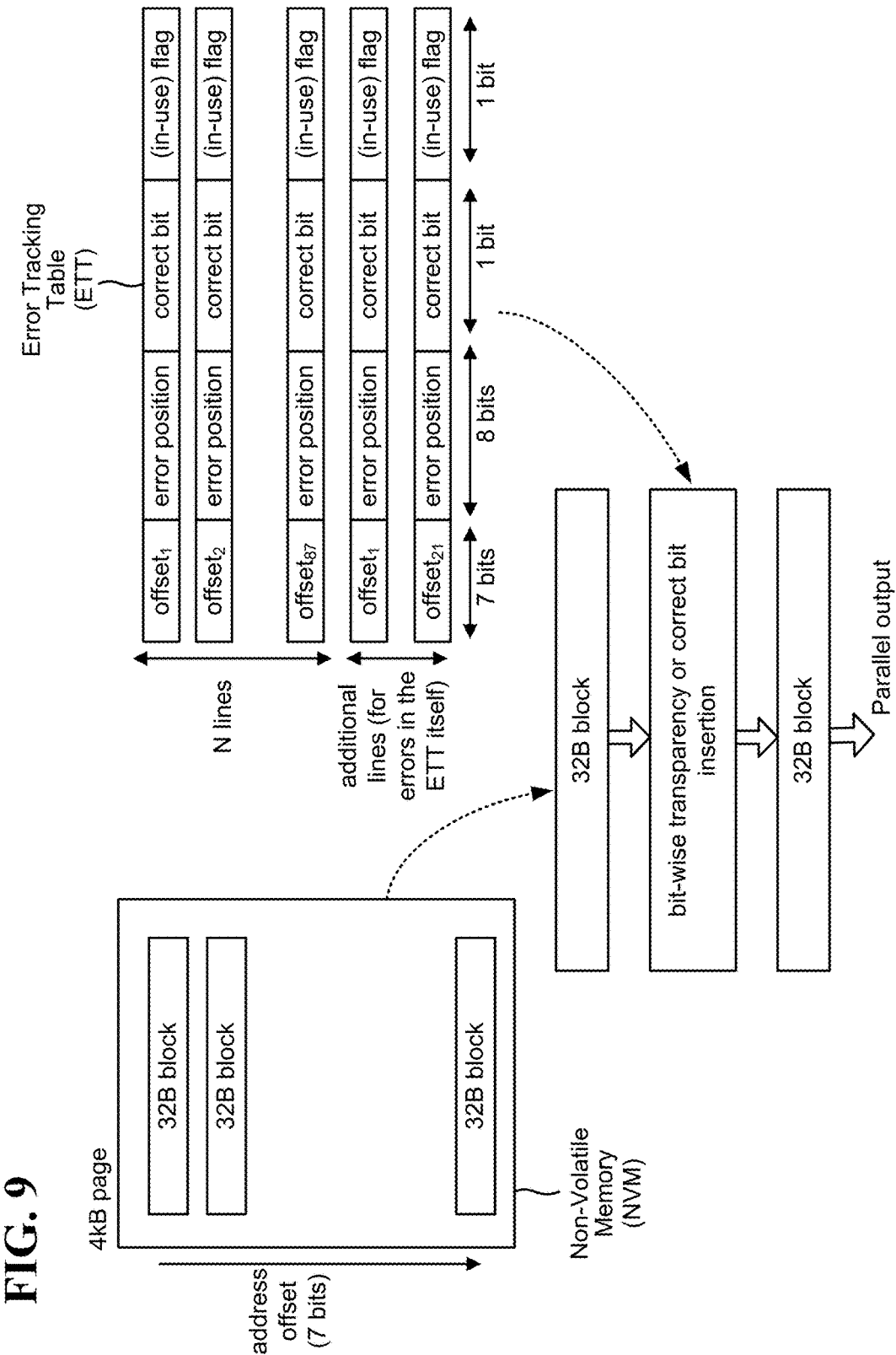
FIG. 9 illustrates an exemplary NVM data readout and parallel ETT query for error correction according to an aspect of the subject specification.

Referring next to FIG. 9, an exemplary NVM data readout and parallel ETT query for error management according to aspects disclosed herein is illustrated for a 4 kB page protection case. Within such embodiment, because data from the NVM is read in parallel with ECV data from the ETT, latency associated with the ETT is hidden, so long as the ETT latency is smaller than the NVM readout latency. Also, this embodiment assumes one bit in error per ETT line, and one or more errors per 32 B block. Furthermore, although the write/read granularity is 32 B, the ETT is dedicated to a 4 kB space, rather than any specific 32 B block, which results in low overhead.

As illustrated, the ETT may include a plurality of entries (e.g., in rows) respectively corresponding to ECV information (e.g., each representing an ECV) associated with individual errors in the NVM. To this end, having the entries include particular details is also contemplated. For instance, each of the plurality of entries may include information corresponding to at least one of an offset, an error position, an error bit, or a usability flag. Within such embodiment, the "offset" may be used to specify an offset into the page at issue and determined by the distance from the start address of a page and the start address of a particular 32 B block as illustrated in FIG. 9; the "error position" may be used to specify the position of the bit in error within the 32 B block, wherein such error position may be encoded in an 8-bit sized field as illustrated in FIG. 9; the "correct bit" may be used to specify the replacement bit for the error position and to indicate the correct bit of information that would have been written in the NVM if the corresponding position in the NVM was not the position of a defective memory cell; and the "usability flag" may be used to specify whether a line of the ETT is already used to report a bit in error or is available to be programmed with the information of a newly discovered bit in error in the 4 kB page. The ETT may also be configured to include entries corresponding to errors associated with the ETT itself, rather than just errors associated with the NVM.

Figure 10:
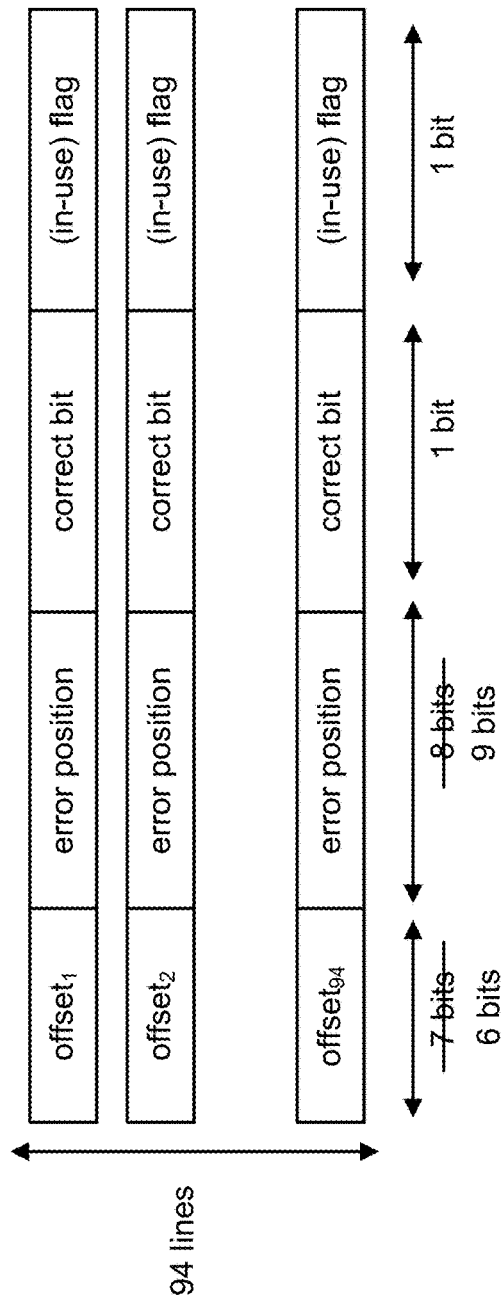
FIG. 10 illustrates an exemplary ETT design modified for 4 kB protection with a 64 B write/read granularity in accordance with aspects disclosed herein.
Figure 11:
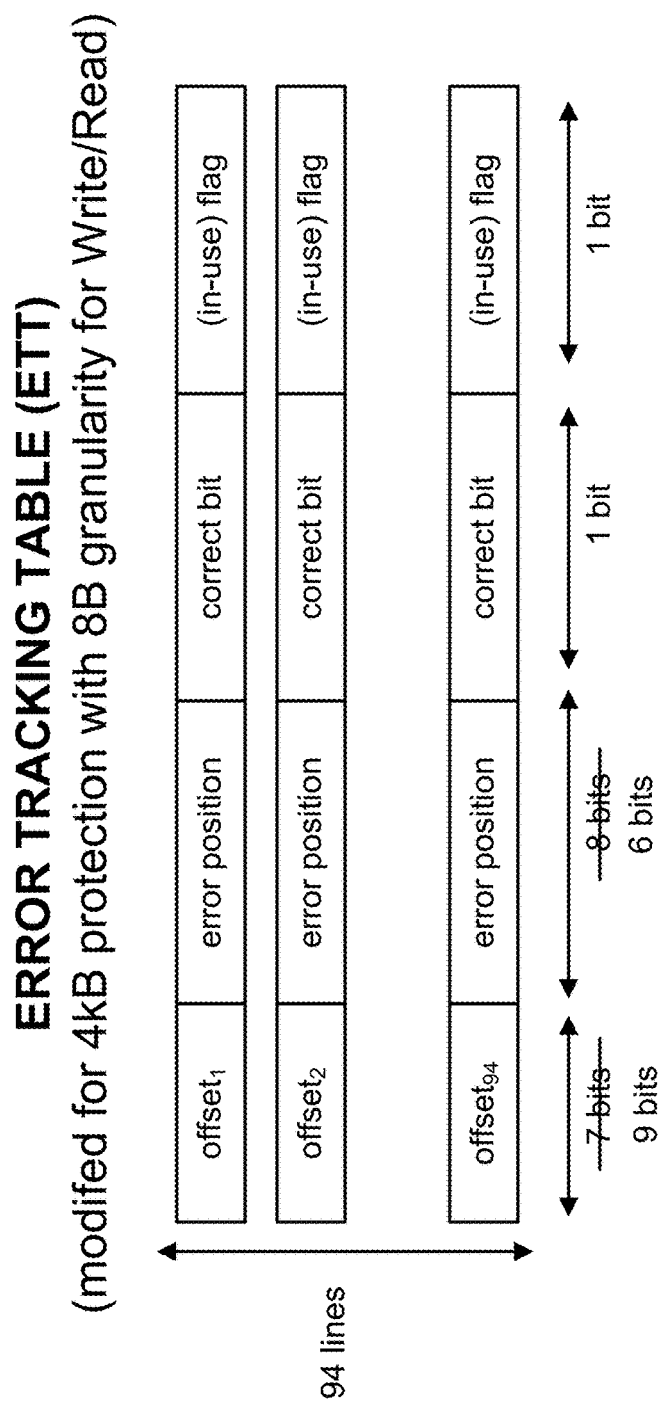
FIG. 11 illustrates an exemplary ETT design modified for 4 kB protection with an 8 B write/read granularity in accordance with aspects disclosed herein.

Referring next to FIGS. 10-11 exemplary ETT designs modified for 4000 byte (4 kB) protection with 64 byte (64 B) and 8 byte (8 B) write/read granularity, respectively, are provided. Here, it should be noted that the overhead in ETT-in-DRAM (or ETT-in-NVM) is the same regardless of whether the write/read granularity is 64 B or 8 B. As illustrated, an ETT-in-DRAM design that protects a 4 kB page is assumed, which represents (at BER=1E-3/ UBER<1E-18) an overhead of approximately 4.9%. (NOTE: When each ETT protects 4 pages or more, overhead drops below 3%. Here, a 1-page protection is used to simplify the analysis).

It should be noted that, although the ETTs illustrated in FIGS. 10-11 are designed to protect 4 kB pages, ETTs that protect pages of various other sizes are also contemplated. With respect to pages that are 4 kB in size, however, the granularity of write and read operations can be 8 B, 32 B or 64 B, wherein 94 error positions are reported in the ETT in order to improve from BER=1×10-3 to UBER<1×10-18. Here, because there are 94 error positions within a 4 kB page, the size of a corresponding ETT is thus independent of the granularity used in read and write operation (i.e., 8 B, 32 B, or 64 B).

It should be further noted that the granularity used for a particular page would effect the number of bits allocated to the "offset" and "error position" fields, as illustrated in FIGS. 10-11. In these examples, there are a total of 15 bits to be repurposed between these two fields, since 15 bits are needed to point to a bit error position in a 4 kB page. For instance, if a 32 B granularity is used while writing and reading from a 4 kB page under ETT protection, 7 of the 15 bits can be allocated for the offset, and 8 of the 15 bits can be allocated for the error position (See e.g., FIG. 9. However, if a 64 B granularity is used as shown in FIG. 10, all data will be read or written in 64 B chunks, wherein 6 of the 15 bits can be allocated for the offset (i.e., there are less 64 B tiles than there were 32 B tiles to cover 4 kB), and 9 of the 15 bits can be allocated for the for the error position. The ETT structure disclosed herein is thus adaptable for 8 B, 32 B or 64 B read and write dataset sizes within a 4 kB page, wherein the offset and error position fields are adjusted according to the selected granularity. Similarly, the ECV constructed for correction of read data at read time will have the size as the selected granularity for read and write operations.

In a particular aspect of the disclosure, multiple Bloom filters per ETT are used as follow-up queries into the unsorted lines of the ETT. For instance, if 96 lines (instead of 94 lines) of ETT-in-DRAM are segmented into 8 regions of 12 lines, then n=12 (address lines in ETT-in-DRAM)
m=64 (bits in hash table)
k=3 (hash functions)
Here, the probability of a false positive f is thus 8.1%, wherein the full ETT-in-DRAM will be represented by 8 Bloom filters to a total of 512 bits.

For some designs (See e.g., embodiment 405 illustrated in FIG. 3), it should be appreciated that 1-burst of 64 B DRAM readout brings 512 bits to the controller. Thus, the controller will be able to determine that no error exists in the data being read (in parallel) from the NVM array, or zoom into the segment(s) of 12 lines in the ETT-in-DRAM where there might be information about an error (in case of false positives) in the subsequent query to the ETT-in-DRAM.

It should be further appreciated that an ETT-in-DRAM design that utilizes Bloom filters allows for efficient retrieval of error information from an ETT-in-DRAM with a partial search already performed. At most two DRAM readouts are used in parallel with a readout from the NVM array.

Referring back to the ETT design illustrated in FIG. 10, particular characteristics should be noted. For instance, 8 Bloom filters are created per ETT-in-DRAM, wherein each Bloom filter uses 64 bits (i.e., m=64 bits) and relates to a segment of 12 lines in the ETT-in-DRAM. Also, once an NVM address is presented to the NVM subsystem, a corresponding ETT-in-DRAM is identified and queried in parallel. Furthermore, 8 Bloom filter data are retrieved in a first query, and the host determines if any of those 8 Bloom filters predicts the NVM address to have been reported with error(s). In case the Bloom filters predict that the address is not in any of the ETT-in-DRAM 12-line segments, it may be concluded that no error exists in the NVM data being read. And in case the Bloom filters predict that an address has been reported in any of those ETT-in-DRAM 12-line segments, the host queries the ETT-in-DRAM, zooming into those segments which were flagged by their Bloom filters. Although this can still be a "false positive", it is now a query into a smaller subset of the ETT-in-DRAM, thus speeding up the whole process of creating the Error Correcting Vectors (ECVs) in case there is (are) error(s).

In an exemplary embodiment, specifications for a reference/baseline multiprocessor system with NVM-as-shared-memory may include:

2 GB per processor core.
processor with 16 cores will use 32 GB of DRAM
quad-processor motherboard will use 128 GB of DRAM
Consider 10× amount of NVM in quad-processor motherboard above:
1.28 TB of NVM available as shared-memory in the quad-processor motherboard
3% of NVM space means 38 GB required for ETT in NVM space.
⅙ of ETT size means 6.4 GB required by Bloom filters With reference to the ETT embodiment 605 illustrated in FIG. 5, it has been found that these specifications result in 38 GB of ETT realized in 1.28 TB of NVM space, and 6.4 GB of Bloom filters realized in 128 GB of DRAM space (4.7% of DRAM space used for Bloom filters). Moreover, a given ETT-in-NVM can be split into sets with a number of lines, for instance, 12-line sets. A Bloom filter is then defined for each of these sets. Thus, during a readout, the NVM array is queried in parallel to a retrieval of all those Bloom filters from an ETT-in-DRAM where the NVM address might have been reported. If, for instance, one of the Bloom filters returns a positive membership for that address, the controller will read only the corresponding 12-line set from the ETT-in-NVM related to that Bloom filter which returned positive membership for the NVM address being read. This results in an improved performance because instead of retrieving the whole ETT, which might have hundreds of lines, only a set or a small set of 12 lines is read from the ETT.

Figure 12:
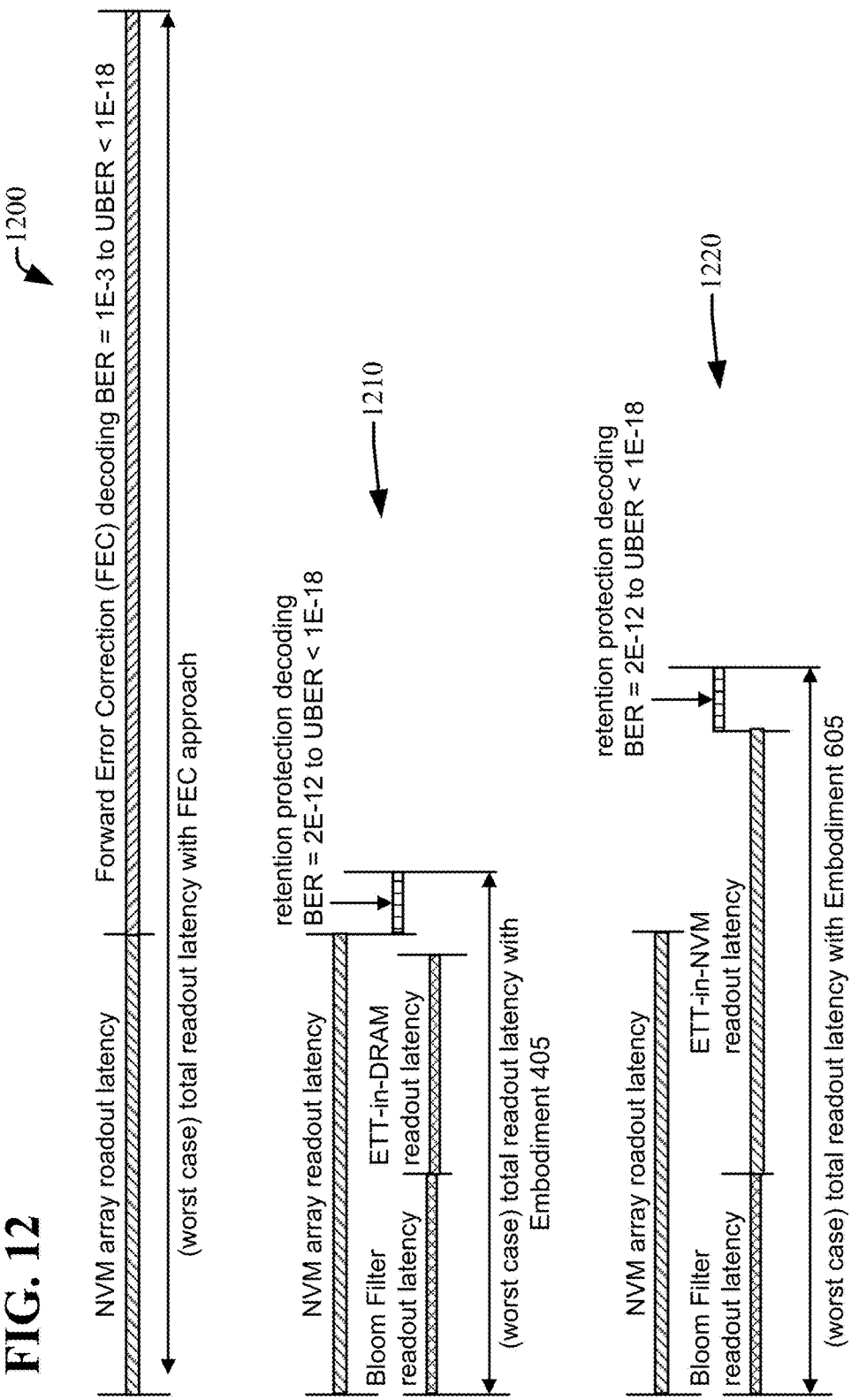
FIG. 12 illustrates exemplary readout latencies for particular ETT design embodiments in accordance with aspects disclosed herein.

Referring next to FIG. 12, an exemplary readout/decode latency of a conventional FEC approach is provided, along with exemplary NVM readout and error correction latencies for particular ETT design embodiments disclosed herein. Specifically, illustration 1200 demonstrates an exemplary readout/decode latency of a conventional FEC approach, whereas illustration 1210 demonstrates an exemplary readout/error correction latency corresponding to an ETT-in-DRAM design disclosed herein (e.g., embodiment 405 corresponding to error management system 400 illustrated in FIG. 3), and illustration 1220 demonstrates an exemplary readout/error correction latency corresponding to an ETT-in-NVM design disclosed herein (e.g., embodiment 605 corresponding to error management system 600 illustrated in FIG. 5). Here, as shown in illustration 1200, the latencies for the NVM readout and decoder are in series when a conventional FEC approach is used (i.e., latencies are added), whereas illustrations 1210 and 1220 correspond to configurations disclosed herein that exploit parallel queries for low latency readout, which result in much lower latencies in readout operation than any FEC approach for 64 B BER=1E-3/UBER<1E-18. In illustration 1210, for example, the disclosed ETT-in-DRAM design exploits parallel queries of the NVM array and the Bloom Filters/ETT-in-DRAM (i.e., latencies are in parallel such that the Bloom Filters and ETT-in-DRAM latencies are hidden). Similarly, illustration 1220 demonstrates how the disclosed ETT-in-NVM design exploits parallel queries of the NVM array and the Bloom Filters/ETT-in-NVM (i.e., latencies are in parallel such that the Bloom Filters and ETT-in-NVM latencies are substantially hidden).

Figure 13:
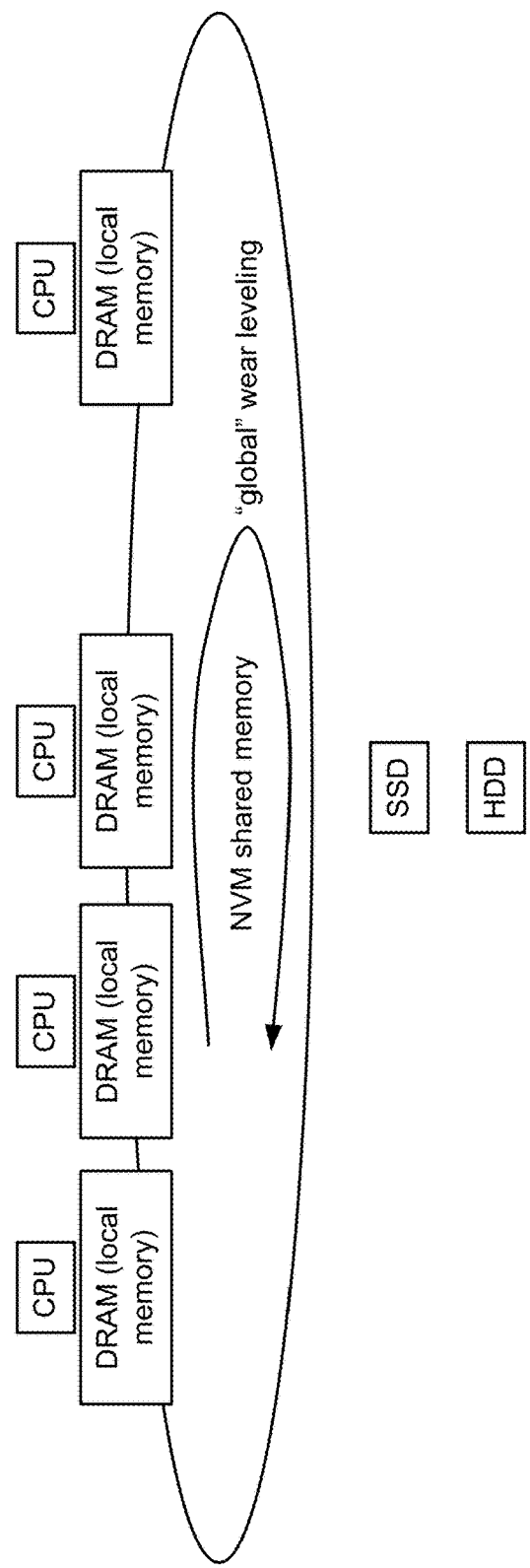
FIG. 13 illustrates an exemplary shared NVM architecture according to the subject specification.

In a further aspect of the disclosure, a shared NVM architecture is contemplated, which desirably fits the current multiprocessor paradigm. To this end, an exemplary shared NVM architecture according to the subject specification is provided in FIG. 13. Here, it should be noted that, in case each microprocessor could decide their own granularity of read and write into the NVM space, it may be desirable to have each microprocessor use the same read/write granularity, if they want to re-use the ETTs created by the processor. It is contemplated that such wear leveling moves data at the granularity of the ETT-in-DRAM or ETT-in-NVM protection size or a multiple of that size. Namely, as previously stated, the information on an ETT protecting a 4 kB page where a particular granularity was chosen, will be consistent with that choice.

It should also be noted that wear leveling may be partially complete in which part of the data is in a new physical address (protected by an ETT), whereas another part of the data is in an old physical address (protected by another ETT). In such circumstances, it may be desirable to use the same granularity for both the old and new physical addresses, which means both ETTs also use the same granularity. Alternatively, a particular wear leveling configuration may be used in which a minimal common multiple of the larger and smaller granularity size is always used when moving data from one physical location to another.

In yet another aspect of the disclosure, it is contemplated that the wear leveling operation may be used to reconstruct the ETTs in the destination of the data. Such a scheme guarantees that any new cell that becomes marginal or a hard error will be reported into the ETT, and that new failing cells might become detectable during wear leveling operation. This is also an opportunity to recreate the Bloom filters. Indeed, in the extraordinary situation where a failing cell "heals itself", it should no longer be reported in the ETT. However, since it is not possible to take that information directly from the Bloom filters, the corresponding Bloom filter may need to be reset where that ETT's line was reported, and re-introduced to all the addresses (12 lines of an ETT in one embodiment) one by one. The wear leveling provides a convenient opportunity to do such ETT update and Bloom filters reset and reconstruction.

It should be noted that, when data is placed in new physical NVM cells, the corresponding Bloom filters have their bits reset to "0" and every new element (i.e., addresses corresponding to cells with limited programmability) is hashed and their bits set to "1". Also, notwithstanding an array of Bloom filters, it should be further noted that removal of elements from a Bloom filter is not possible. Namely, because returning the bits which were set by the inclusion of an element to "0" might affect the bits corresponding to another element in the set, wherein false negatives, which are undesirable, might start to appear.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment.

What is claimed is:

1. A system, comprising:
   a non-volatile memory (NVM) component configured to store data in an NVM array;
   an error tracking table (ETT) component configured to store error correction vector (ECV) information associated with the NVM array, wherein the ETT component is within one of a dynamic random access memory (DRAM) or a second NVM component;
   a controller configured to perform a parallel query of the NVM array and the ETT component, wherein the parallel query includes a query of the NVM array that yields a readout of the NVM array and a query of the ETT component that yields a construction of an ECV corresponding to the readout of the NVM array; and
   at least one Bloom filter configured to predict at least one subset of ETT component entries in which at least one of the ETT component entries corresponds to a reporting of an error in the NVM array.

2. The system of claim 1, wherein the query of the ETT component is limited to a query of the at least one subset of ETT component entries predicted by the at least one Bloom filter.

3. The system of claim 2, wherein the ETT component is configured within the DRAM, and wherein the at least one Bloom filter is configured within the controller.

4. The system of claim 2, wherein each of the at least one Bloom filter and the ETT component are configured within the DRAM.

5. The system of claim 2, wherein each of the at least one Bloom filter and the ETT component are configured within the second NVM component.

6. The system of claim 2, wherein the ETT component is configured within the second NVM component, and wherein the at least one Bloom filter is configured within the DRAM.

7. The system of claim 2, wherein the readout of the NVM array comprises a readout of 4000 byte data pages.

8. The system of claim 7, wherein the readout of the NVM array comprises a readout granularity of 64 bytes or 8 bytes.

9. The system of claim 8, wherein the readout granularity is 64 bytes, and wherein the at least one Bloom filter comprises 8 Bloom filters.

10. The system of claim 1, wherein the NVM is a shared NVM controllable by each of a plurality of processors.

11. A method, comprising:
    storing data in a non-volatile memory (NVM) array;
    storing error correction vector (ECV) information associated with the NVM array in an error tracking table (ETT);
    filtering the ETT with at least one Bloom filter to predict at least one subset of ETT entries in which at least one of the ETT entries corresponds to a reporting of an error in the NVM array; and
    performing a parallel query of the NVM array and the ETT, wherein the parallel query includes a query of the NVM array that yields a readout of the NVM array and a query of the ETT that yields a construction of an ECV corresponding to the readout of the NVM array, and wherein the query of the ETT is limited to a query of the at least one subset of ETT entries predicted by the at least one Bloom filter.

12. The method of claim 11, wherein the storing of ECV information comprises storing the ECV information in an ETT within one of a dynamic random access memory (DRAM) or a second NVM component.

13. The method of claim 12, wherein the storing of ECV information comprises storing the ECV information in an ETT within the DRAM, and wherein the filtering of the ETT comprises filtering the ETT with at least one Bloom filter within the controller.

14. The method of claim 12, wherein the storing of ECV information comprises storing the ECV information in an ETT within the DRAM, and wherein the filtering of the ETT comprises filtering the ETT with at least one Bloom filter within the DRAM.

15. The method of claim 12, wherein the storing of ECV information comprises storing the ECV information in an ETT within the second NVM component, and wherein the filtering of the ETT comprises filtering the ETT with at least one Bloom filter within the second NVM component.

16. The method of claim 12, wherein the storing of ECV information comprises storing the ECV information in an ETT within the second NVM component, and wherein the filtering of the ETT comprises filtering the ETT with at least one Bloom filter within the DRAM.

17. The method of claim 11, wherein the ETT includes a plurality of entries respectively corresponding to information associated with individual cells in the NVM array, and wherein each of the plurality of entries includes information corresponding to at least one of an offset, an error position, an error bit, or a usability flag.

18. The method of claim 11, further comprising performing a wear leveling, wherein the wear leveling comprises moving data between cells of the NVM array at a granularity corresponding to one of a protection size of the ETT or a multiple of the protection size of the ETT.

19. The method of claim 18, further comprising resetting a bit of the at least one Bloom filter in response to the wear leveling.

20. An apparatus, comprising:
means for storing data in a non-volatile memory (NVM) array;
means for storing error correction vector (ECV) information associated with the NVM array in an error tracking table (ETT);
means for filtering the ETT with at least one Bloom filter to predict at least one subset of ETT entries in which at least one of the ETT entries corresponds to a reporting of an error in the NVM array; and
means for performing a parallel query of the NVM array and the ETT, wherein the parallel query includes a query of the NVM array that yields a readout of the NVM array and a query of the ETT that yields a construction of an ECV corresponding to the readout of the NVM array, and wherein the query of the ETT is limited to a query of the at least one subset of ETT entries predicted by the at least one Bloom filter.

21. The apparatus of claim 20, wherein the means for storing the ECV information comprises means for storing the ECV information in an ETT within one of a dynamic random access memory (DRAM) or a second NVM component.

22. The apparatus of claim 21, wherein the means for storing the ECV information comprises means for storing the ECV information in an ETT within the DRAM, and wherein the means for filtering the ETT comprises means for filtering the ETT with at least one Bloom filter within the controller.

23. The apparatus of claim 21, wherein the means for storing the ECV information comprises means for storing the ECV information in an ETT within the DRAM, and wherein the means for filtering the ETT comprises means for filtering the ETT with at least one Bloom filter within the DRAM.

24. The apparatus of claim 21, wherein the means for storing the ECV information comprises means for storing the ECV information in an ETT within the second NVM component, and wherein the means for filtering the ETT comprises means for filtering the ETT with at least one Bloom filter within the second NVM component.

25. The apparatus of claim 21, wherein the storing of ECV information comprises storing the ECV information in an ETT within the second NVM component, and wherein the filtering of the ETT comprises filtering the ETT with at least one Bloom filter within the DRAM.

* * * * *